Jan. 11, 1938. J. H. SHARP Re. 20,620

TORQUE MEASURING WRENCH

Original Filed May 18, 1931

Inventor

John H. Sharp

By Towson Price

Attorney

Reissued Jan. 11, 1938

Re. 20,620

UNITED STATES PATENT OFFICE 20,620

TORQUE MEASURING WRENCH

John H. Sharp, Chicago, Ill., assignor to Automotive Maintenance Machinery Co., North Chicago, Ill., a corporation of Illinois Original No. 2,007,880, dated July 9, 1935, Serial No. 538,292, May 18, 1931. Application for reissue December 14, 1936, Serial No. 115,889

6 Claims. (Cl. 265—1)

This invention relates to wrenches, and more particularly to one for indicating the amount of force or torque applied in tightening or loosening a nut.

The principal object of my invention, generally considered, is the provision of a wrench adapted to indicate the amount of torque used in tightening or removing nuts, and provided with a pointer which moves when associated spring means are stressed to show on a scale the amount of torque applied.

Another object of my invention is to provide a wrench adapted for use as means for applying different nuts for comparative test under identical loads, as means for measuring the amount of labor required to apply or remove different types of nuts, or as a means for measuring the locking efficiency of nuts on several applications and removals.

A further object of my invention is to provide a wrench adapted to be used with nuts as a means of measuring loss of locking efficiency of such nuts on account of removal and reapplication, as a means of determining the effect of different types of lock nuts on bolt threads at the same load, or as a means of determining the holding power of different types of lock nuts at varying loads.

Other objects and advantages of the invention relating to the particular arrangement and construction of the various parts will become apparent as the description proceeds.

Referring to the drawing illustrating my invention, the scope whereof is defined by the appended claims:—

Figure 1:
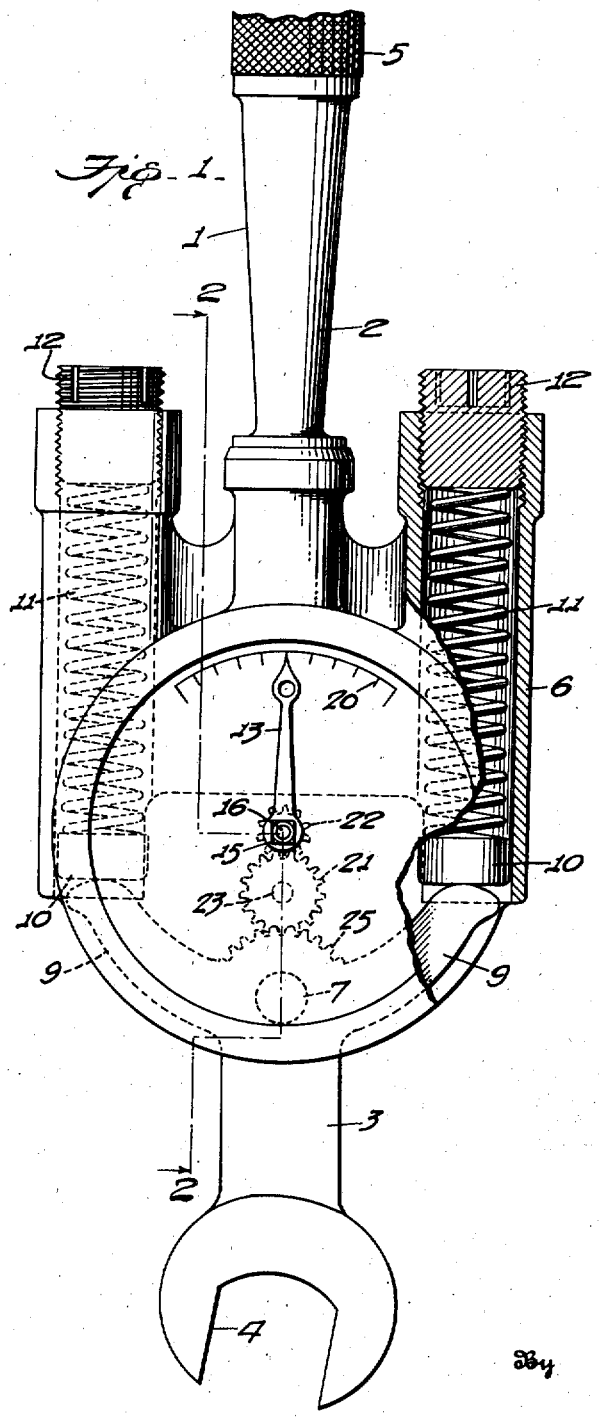
Figure 1 is a side elevation of one embodiment of my wrench, a portion being shown in section.

In determining the efficiency of grip or locking nuts, it is desirable to know not only that such nuts are difficult to remove after application, but also the amount of torque or number of inch-pounds necessarily used to apply or remove such nuts. I have, therefore, devised a wrench which directly indicates the number of inch-pounds employed in tightening and removing nuts.

Referring to the drawing in detail, like parts being designated by like reference characters, I have shown one form of my wrench or torque indicating device 1 involving a handle and housing portion 2 and a wrench or pivotally mounted shank and jaw portion 3, the free end of the shank portion being formed with a jaw 4 adapted to engage a nut (not shown). Although the jaw 4 is shown as rigid and non-adjustable, it will be understood that, if desired, I may provide an adjustable jaw portion such as is used on monkey-wrenches.

The portion 2 involves a handle 5 adapted to be manually grasped in operating the wrench, and a housing portion 6. The shank and jaw portion 3 of my wrench is desirably connected to the housing portion 6 by means of a pivot pin 7 secured to said housing portion 6 in any desired manner, as by being threadably connected thereto, as indicated at 8. The shank portion 3 has extended laterally therefrom on opposite sides of the pivot pin 7 preferably integral arms 9, said arms being desirably curved so as to be normally enclosed by the housing 6, and with their free ends engaging followers or spring caps 10 engaging or connected to the adjacent ends of preferably helical springs 11 mounted and guided in the housing 6, and held under a desired degree of compression against the arms 9 by means of adjusting plugs 12 threadably mounted in the housing 6.

Means are provided for indicating the amount of force or torque applied to the handle 5 of the wrench in tightening or removing an associated nut, said means, in the present embodiment, comprising a pointer 13 pivotally mounted on the housing 6 of the shank portion 2, as by means of a pivot pin 14. Said pointer may be tightened on the pin 14 so as to be movable therewith in any desired manner, as by means of a nut 15 engaging the threaded end 16 of the pin 14 and tightly holding the pointer 13 against a shouldered portion 17 on said pin. The pin may be held in place in the housing portion 6 of the wrench by any desired means, such as the plug 18 threadably connected to the housing 6 and closing the pin receiving aperture 19 therein. The pointer moves over a scale 20 which may be calibrated to register the force or torque applied to the handle 5 of the wrench in applying or removing a nut from an associated bolt in terms of inch-pounds or other appropriate units.

Figure 2:
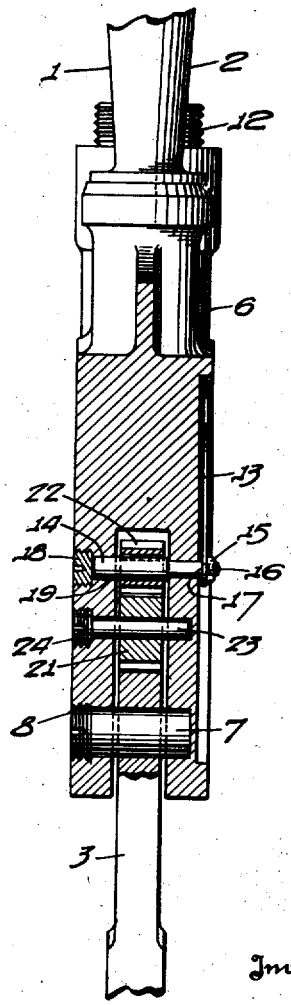
Figure 2 is a transverse sectional view on the line 2—2 of Figure 1, looking in the direction of the arrows.

As a means for transmitting motion between the jaw or pivoted portion 3 of the wrench and the pointer 13 to indicate relative angular movement and corresponding torque, a gear wheel or idler 21 is desirably pivotally mounted in the housing 6 and disposed between a pinion 22 non-rotatably mounted on the pin 14, as by being keyed or connected thereto in any desired manner. The pivot pin 23 upon which the gear wheel or idler 21 is mounted may be held in position in any desired manner, as by means of an enlarged end portion 24 threaded into the housing 6, as shown most clearly in Figure 2. That part of the shank portion 3 adjacent the idler 21, and between the arms 9, is formed with gear teeth 25 meshing with the idler gear teeth, as shown most clearly in Figure 1, so that upon relative angular movement of the shank portion 2 of the wrench upon applying force to the handle 5 thereof, said gear teeth 25 on the jaw portion 3 transmit corresponding motion through the idler 21 to the pinion 22 and through the pin 14 to the pointer 13 to indicate the torque on the associated scale 20.

From the foregoing disclosure, it will be seen that I have devised a torque indicating wrench which is useful for all kinds of force measurements on nuts, being especially designed for grip or locking nuts. By providing the spring adjusting plugs 12, not only may the associated springs 11 be conveniently applied and removed for replacement, when necessary, but the desired initial tension may be applied thereto for not only setting the pointer at zero position, when the shank is in neutral position generally aligned with the handle, but also for adjusting the mechanism for the most efficient operating position and degree of spring compression.

Although a preferred embodiment of my invention has been illustrated, it will be understood that modifications may be made within the spirit and scope of the appended claims without departing from my invention.

I claim:

1. A torque indicating device comprising a housing portion with a manually operable handle extending therefrom, a wrench portion with a jaw adapted to engage a nut and a shank extending therefrom and with its end portion received in and pivoted to said housing, arms extending laterally from the pivoted portion of said shank, springs disposed in said housing and acting in the same general direction on opposite ends of said arms, so as to normally hold the shank in neutral position, generally aligned with the handle, movable means engaging the ends of said springs away from said arms for adjusting the spring pressure, a dial on one face of said housing, a pointer pivotally mounted on said housing and movable over said dial, and means for transmitting motion from said shank to said pointer, upon movement of said housing and handle portion with respect to the wrench portion, for indicating the amount of torque applied to said device.

2. A torque indicating device comprising a housing portion with a manually operable handle extending therefrom, a wrench portion with a jaw adapted to engage a nut and a shank extending therefrom and with its end portion received in and pivoted to said housing, coil springs guided in said housing and acting on said arms on opposite sides of the pivoted portion of said shank, to normally resiliently hold the parts in neutral relative positions, plugs threaded in the housing and engaging the ends of said springs away from said arms for adjusting the spring pressure, a dial on one face of said housing, a pointer pivotally mounted on said housing and movable over said dial, and gearing means for transmitting motion from said shank to said pointer, upon movement of said housing and handle portion with respect to the wrench portion, for indicating the amount of torque applied to said device.

3. A torque indicating device comprising a housing portion with a manually operable handle extending therefrom, a wrench portion with a jaw adapted to engage a nut and a shank extending therefrom and with its end portion received in and pivoted to said housing, arms extending laterally from the pivoted portion of said shank, springs disposed in said housing and acting, substantially parallel to the handle on said arms on opposite sides of the pivoted portion, to normally resiliently hold the parts in neutral relative positions, means for adjusting the spring pressure, a dial, a pointer movable over said dial, and means for transmitting motion from said shank to said pointer, upon movement of said housing and handle portion with respect to the wrench portion, for indicating the amount of torque applied through said device to a nut.

4. A torque indicating wrench comprising a housing portion with a manually operable handle extending therefrom, a wrench member pivotally supported by said housing portion and having provision for engaging a nut, said wrench member having arms extending laterally from the pivoted portion thereof, said housing portion including a hollow part, a spring disposed in said hollow part and acting on the end portion of one of said arms, means against which the other of said arms abuts for holding said wrench member in a neutral position with said arms disposed at substantially right angles to said handle and with said one arm operatively engaged with said spring, and means for indicating the amount of torque applied through the device to a nut, which includes a dial, a pointer and means by which movement of said wrench member, arms and spring is transmitted to said pointer upon movement of said wrench member relative to said housing and handle portions.

5. A torque indicating wrench comprising a part having a manually operable handle extending therefrom, another part pivotally supported by said first part and having provision for engaging a nut, or the like, one of said parts having a spring chamber, a spring mounted in said chamber, a follower member slidably mounted in said chamber at one end of said spring and operatively engaging said spring with the other of said parts, whereby relative pivotal movement of said two parts in one direction is yieldably opposed by said spring, an adjustable support for the other end of said spring associated with said chamber, whereby effective initial tension of said spring may be varied, and means for indicating the amount of torque applied through the wrench to a nut, or the like, which includes a dial, a pointer and means by which pivotal motion between said two parts is transmitted to said pointer.

6. A torque indicating device comprising a housing portion with a manually operable handle extending therefrom, a wrench member pivotally supported by said housing and having provision for engaging a nut, or the like, said wrench member also having an arm extending laterally from the pivoted portion thereof, said housing portion including a tubular part located adjacent the outer end of said arm, a spring mounted in said tubular part, a follower member slidably guided in said tubular part and so constructed and arranged that it is engaged by the outer end portion of said arm and it abuts the adjacent end of said spring whereby said spring may be compressed through force applied by said arm without distorting the axial compression movement of said spring, means normally opposing pivotal movement of said wrench member and its arm in a direction away from said follower, and means operable upon relative pivotal movement of said housing and wrench member for indicating the amount of torque applied through the wrench to the nut, or the like.

JOHN H. SHARP.